C. J. EVERETT.
ELECTRIC BATTERY.
APPLICATION FILED MAR. 6, 1905.

977,721.

Patented Dec. 6, 1910.

2 SHEETS—SHEET 1.

Witnesses:
F. George Barry,
Henry Thieme

Inventor:
Charles J. Everett
by attorneys

C. J. EVERETT.
ELECTRIC BATTERY.
APPLICATION FILED MAR. 6, 1905.
977,721.
Patented Dec. 6, 1910.
2 SHEETS—SHEET 2.
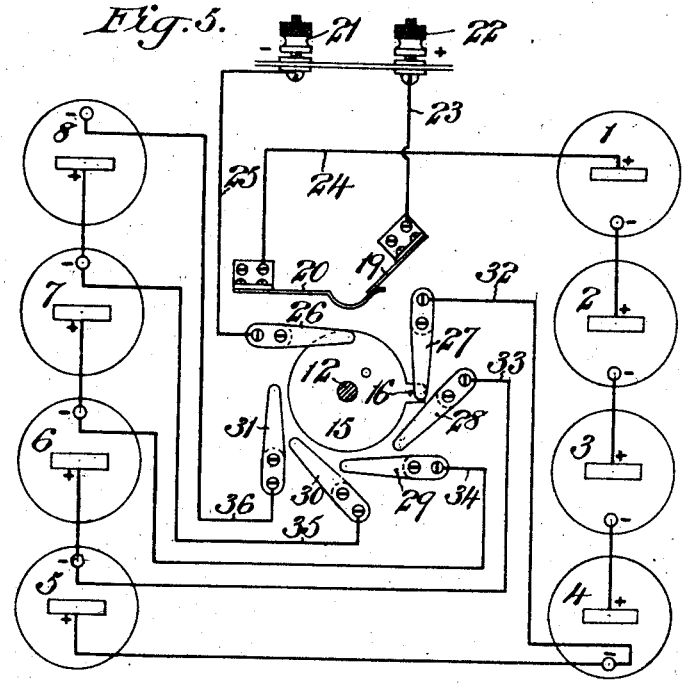
Fig. 5.
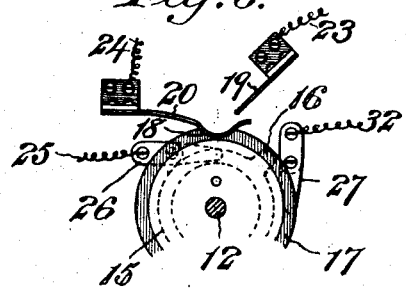
Fig. 6.
Fig. 7.
Witnesses:
J. George Barry
Henry Thieme
Inventor:
Charles J. Everett
by attorneys
Thomas Seward

UNITED STATES PATENT OFFICE.

CHARLES J. EVERETT, OF NEW YORK, N. Y.

ELECTRIC BATTERY.

977,721.  Specification of Letters Patent.  Patented Dec. 6, 1910.

Application filed March 6, 1905. Serial No. 248,413.

*To all whom it may concern:*

Be it known that I, CHARLES J. EVERETT, a citizen of the United States, and resident of the borough of Manhattan, in the city and State of New York, have invented a new and useful Electric Battery, of which the following is a specification.

The object of this present invention is to provide an electric battery in which the switch is located entirely within a box inclosing the battery cells so that current may be cut off from the terminals on the exterior of the box when so desired, for preventing an external connection between the poles of the battery when the switch is off.

A further object is to provide a water tight box for inclosing the cells and switch.

A still further object is to provide a simple and effective means for bringing additional cells of a battery successively into the battery circuit.

Figure 1:
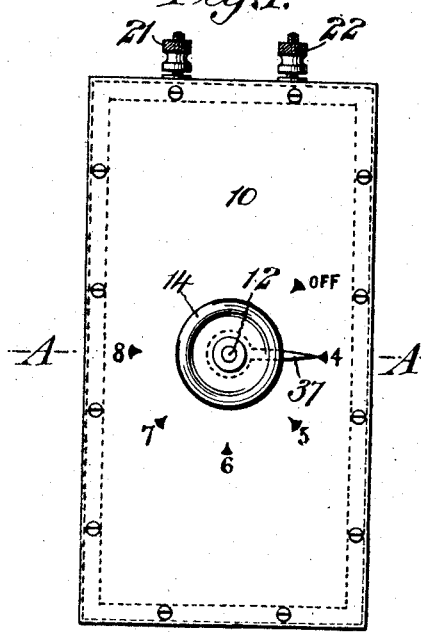
Figure 3:
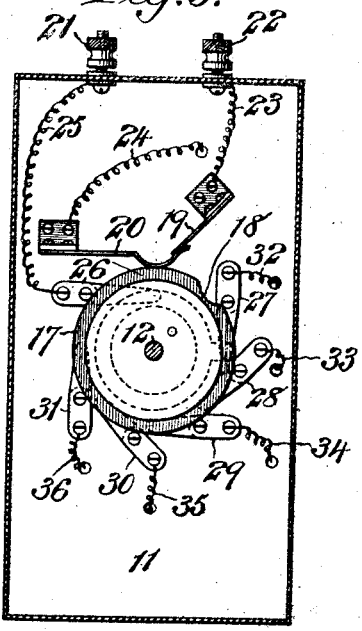
Figure 2:
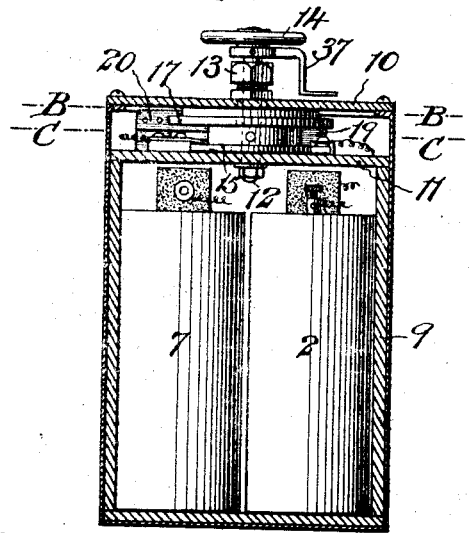
Figure 4:
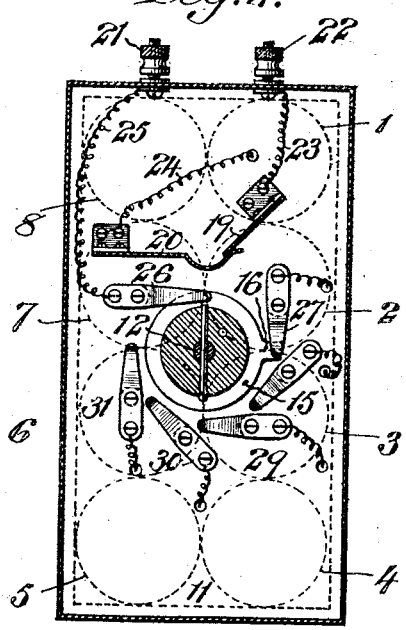

In the accompanying drawings, Figure 1 represents my improved electric battery in top plan, Fig. 2 is a vertical transverse section through the battery taken in the plane of the line A—A of Fig. 1, Fig. 3 is a horizontal section taken in the plane of the line B—B of Fig. 2, Fig. 4 is a horizontal section taken in the plane of the line C—C of Fig. 2, Fig. 5 is a diagrammatic view showing the electrical connections, Fig. 6 is a detail plan view showing the positions which the parts assume when circuit is broken at the switch, and Fig. 7 is a detail side view of one of the battery contacts.

The eight battery cells are herein denoted by the numerals 1, 2, 3, 4, 5, 6, 7 and 8. The cells are connected in series as usual.

A battery box is provided for the cells, which box is denoted by 9. This box has a top 10 and a horizontal partition 11 located within the box just above the tops of the battery cells. This box is made liquid tight so as to prevent the admission of moisture to the interior of the same and the cells herein represented are of the well known dry cell type.

The switch for the battery is located entirely within the box, in the present instance in the space between the top or cover 10 of the box and the partition 11. This is constructed, arranged and operated as follows:—A vertical shaft 12 is mounted in a packed bearing 13 in the top 10 of the box for preventing the admission of moisture to the interior of the box. This shaft 12 is provided exterior to the box with an operating handle 14.

Within the box the shaft 12 has fixed thereto adjacent to the partition 11, a contact plate 15, which forms the rotary contact of the switch. This contact plate 15 is provided on its periphery with a lug 16 arranged to be brought successively into engagement with the battery contacts to be herein described. This handle shaft 12 is further provided with a disk 17 of insulating material, such, for instance, as fiber, the periphery of which disk is provided with a recess 18.

An auxiliary circuit maker and breaker is located in the battery circuit, which circuit maker and breaker comprises arms 19 and 20 located in the space between the top and partition of the box. This arm 20 is held pressed against the arm 19 because of its engagement with the periphery of the insulating disk 17.

When the disk is rotated to bring the recess 18 opposite the arm 20, it will permit the arm to spring back away from its contact with the arm 19.

Battery terminals 21, 22, are mounted on the exterior of the battery box. The terminal 22 is connected through a wire 23 within the box to the arm 19 of the circuit maker and breaker. The arm 20 of the circuit maker and breaker is connected by a wire 24 with the + side of the battery cell 1. The terminal 21 is connected by a wire 25 within the box to a spring contact 26 which is at all times in engagement with the rotary contact 15.

A series of spring actuated battery contacts are located in position to be successively engaged by the lug 16 of the rotary contact. In the present instance I have shown five of these battery contacts denoted, respectively, by 27, 28, 29, 30 and 31. These contacts are connected through wires 32, 33, 34, 35, and 36, to the — sides of the battery cells 4 to 8 inclusive.

As the contact 15 is rotated by the handle 14 it will successively bring into the battery circuit the cells 5, 6, 7 and 8, as desired to replenish the electric current.

When it is desired to break the current, the handle 14 is turned to bring the parts into the position shown in Fig. 6 with the recess 18 in the insulating disk 17 opposite the arm 20 of the circuit maker and breaker, and the lug 16 of the disk 15 out of engagement with all of the battery contacts. This will permit the arm 20 to be released from its engagement with the arm 19 thereby cutting off the terminal 22 within the box. The terminal 21 is also cut off because of the position which the lug 16 of the disk 15 assumes. It will thus be seen that the electric circuit is cut off from within the box from both of the terminals 21, 22, doubly insuring the prevention of a bridge being formed between the terminals or between one of the terminals and a part of the box.

The handle shaft 12 may be provided exterior to the box with a pointer 37 which may be used in connection with an index on the top of the box for indicating whether the circuit within the box is broken and for indicating the number of cells which are in the battery circuit.

It is evident that this device may be used in connection with batteries having a greater or lesser number of cells than that herein represented, the particular number shown being chosen to give a clear understanding of the invention.

What I claim is:—

1. In an electric battery, a plurality of cells, a box inclosing the same, battery terminals, a switch located within the box arranged to cut off one of the battery terminals, an auxiliary circuit maker and breaker under the control of the switch for cutting off the other battery terminal and means exterior to the box for operating the switch.

2. In an electric battery, a plurality of cells, a box inclosing the same, battery terminals, a switch located within the box arranged to cut off one of the battery terminals and to successively bring additional cells into the battery circuit, an auxiliary circuit maker and breaker under the control of the switch for cutting off the other battery terminal and means exterior to the box for operating the switch.

In testimony, that I claim the foregoing as my invention, I have signed my name in presence of two witnesses, this 28th day of February, 1905.

CHARLES J. EVERETT.

Witnesses:
FRED HAYNES,
C. S. SUNDGREN.